July 25, 1939.  R. MALCOM  2,167,580
FACE PROTECTOR
Filed June 22, 1937
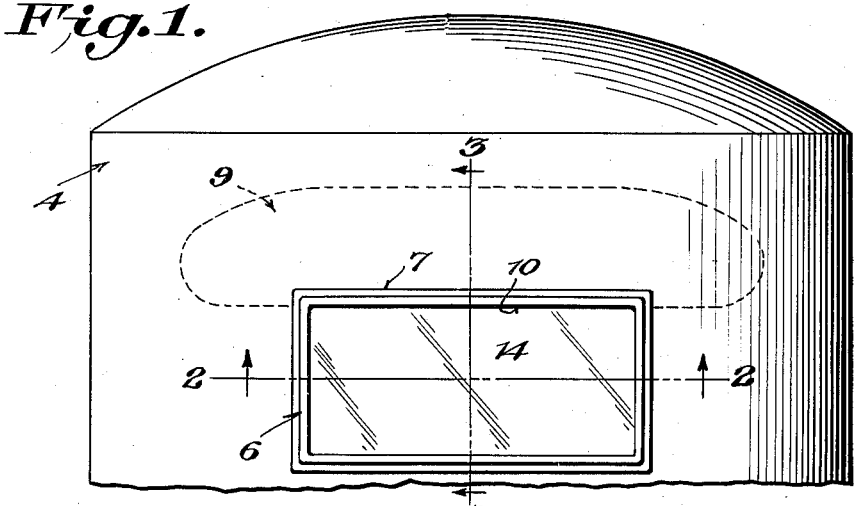
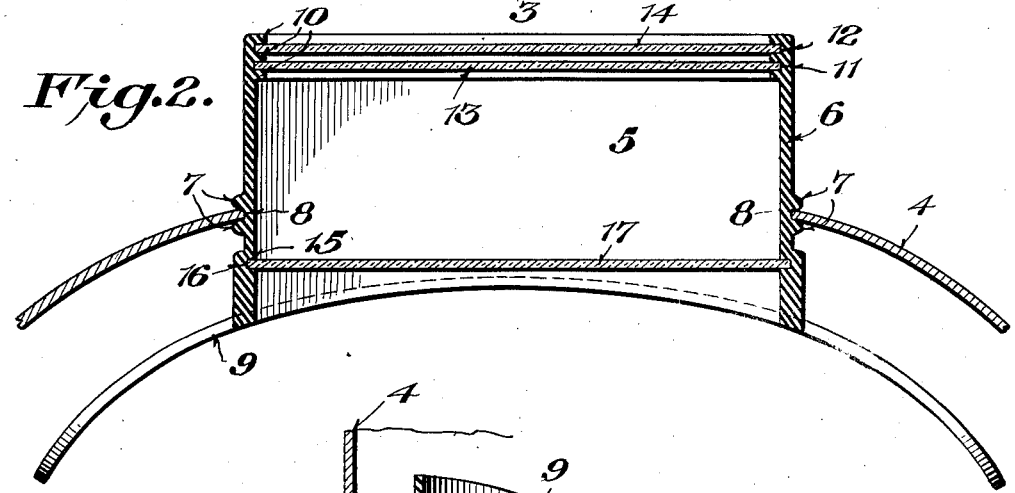
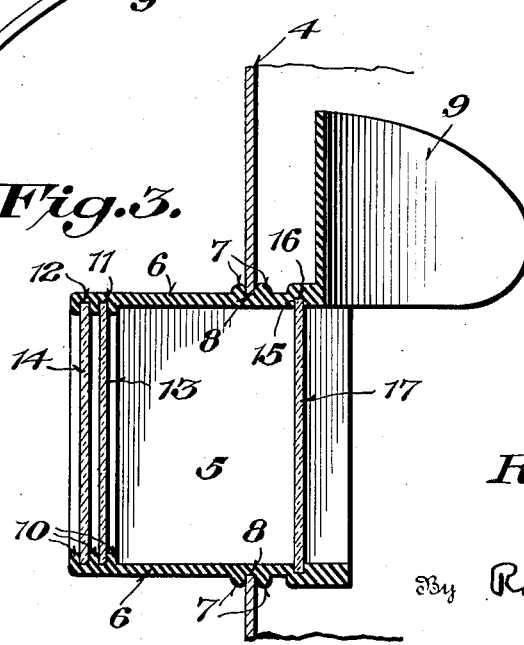
Inventor
Robert Malcom,
By Royal E. Burnham,
Attorney Patented July 25, 1939

2,167,580

UNITED STATES PATENT OFFICE 2,167,580

FACE PROTECTOR

Robert Malcom, Chicago, Ill.

Application June 22, 1937, Serial No. 149,759

2 Claims. (Cl. 2—8)

This invention relates to face-protectors of the type used by welders and others engaged in work that requires protection from sparks and other flying particles and from intense glaring light.

It is an object of the invention to provide for such articles an eyepiece that may be associated with a face-shield without the use of rivets or other fasteners.

Another object is to provide an eyepiece for such shields that has a body formed of a single piece of molded rubber or equivalent material that reliably holds in place the glass or lenses and has means whereby itself is held in the shield.

Further, the invention provides an eyepiece that readily may be pushed into the shield opening and withdrawn therefrom.

It also is an object to provide an eyepiece that has a part to rest against the forehead of the user to space the shield from his face.

The characteristics of the invention are apparent in the accompanying drawing, forming part hereof, when considered with the description herein, the drawing showing an adaptation of the invention for purposes of illustration.

Like reference-characters refer to corresponding parts in the views of the drawing, of which—

Fig. 1 is a fragmentary front view of a face-shield having the eyepiece of this invention associated therewith;

Fig. 2 is a section on the line 2—2, Fig. 1;

Fig. 3 is a section on the line 3—3, Fig. 1.

The shield 4 may be made of fiber or other comparatively thin relatively rigid sheet material; and, so far as concerns this invention, it may be an article that can be held in place by a hand of the user or it may be part of a helmet or the like that can be secured to the head by a band or other suitable means not shown.

The shield has an opening in its front through which, or through the eyepiece therein, the user may see the work on which he is engaged.

In order to protect the user of such a device from injury to his eyes by flying particles and intense light, the invention provides an eyepiece in the sight opening that includes a body 5 of box-like formation having walls 6, and it is of shape and size to fill the opening.

Exterior shoulders 7, positioned forwardly of the rear or face side of the body, extend entirely therearound, and they are spaced from each other and provide between them a groove 8 of a width requisite for the edge of the shield opening to be disposed between them with a retentive grip in the groove.

The body 5 has molded and integrally formed therewith at its inner or face side a flange 9 that extends thereabove and laterally from its sides and is curved and positioned to rest and conform to the contour of the forehead or other head part of the user when the shield is in place over the face to space the shield therefrom. The flange serves as a cushion-like bearing against the head part and prevents injury to the face that is liable to occur when the shield is swung quickly thereto.

The body 5 is moulded with three internal shoulders 10 near its outer end, which provide grooves 11 and 12 in which are held a colored light-retarding lens 13 and outside thereof and protecting it a cover lens 14. The body is formed near its inner end with internal shoulders 15, which provides between them a groove 16, in which is held an anti-glare lens 17 to protect the user from heat and injurious invisible light.

The body 5 is moldably formed of rubber or other pliable, elastic, and resilient material as an integral structure that includes the head-rest flange.

The lenses may be placed in the eyepiece body between the shoulders and removed therefrom by stretching the material of the body, yet that material is sufficiently strong and firm to retain the lenses in place during ordinary usage. Ordinarily, during use, it is necessary to remove only the cover lens for replacement after it has become injured and rendered murky by impact of flying particles.

The eyepiece body easily may be pushed from the inside of the shield into the opening thereof until the outer exterior shoulder 7 passes through the opening, whereupon the edge of the opening is gripped between both shoulders and the eyepiece firmly held in place. Likewise, the eyepiece may be withdrawn backwardly through the opening when it is desired to dissociate it from the shield.

What I claim as new, and desire to secure by Letters Patent, is—

1. A face-shield comprising a facepiece of stiff sheet material having a sight opening, and an eyepiece of soft rubber in and conforming to said opening having an external groove in which the edge of said opening retentively engages, said eyepiece extending inside of said facepiece, and on the inner end of said eyepiece a wide flange extending laterally therefrom and curved to conform generally to and adapted to rest against a head part of the user and space said facepiece from his face, said eyepiece containing a lens.

2. An eyepiece of soft rubber for face-shields having an external groove extending therearound for reception of the edge of a sight opening in the shield, and a wide flange integrally formed with said eyepiece to the rear of and spaced from said groove, said flange extending laterally outside of said eyepiece and being curved to conform generally to and adapted to rest against a headpart of the user and space the shield from his face.

ROBERT MALCOM.